(12) United States Patent
Cornwall

(10) Patent No.: US 9,982,823 B1
(45) Date of Patent: May 29, 2018

(54) PIPE COUPLING

(71) Applicant: Kenneth R. Cornwall, Johns Creek, GA (US)

(72) Inventor: Kenneth R. Cornwall, Johns Creek, GA (US)

(73) Assignee: ProVent Systems, Inc., Lawrenceville, GA (US)

( * ) Notice: Subject to any disclaimer, the term of this patent is extended or adjusted under 35 U.S.C. 154(b) by 0 days. days.

(21) Appl. No.: 15/448,963

(22) Filed: Mar. 3, 2017

(51) Int. Cl.
*F16L 51/00* (2006.01)
*F16L 27/12* (2006.01)
*F16L 21/06* (2006.01)
*G01M 3/28* (2006.01)

(52) U.S. Cl.
CPC ............... *F16L 51/00* (2013.01); *F16L 21/06* (2013.01); *F16L 27/12* (2013.01); *G01M 3/2815* (2013.01); *G01M 3/2853* (2013.01); *F16L 2201/30* (2013.01)

(58) Field of Classification Search
None
See application file for complete search history.

(56) References Cited

U.S. PATENT DOCUMENTS 3,479,066 A * 11/1969 Gittleman ............ F16L 21/005
285/236
3,495,856 A * 2/1970 Daymond ............... F16L 27/12
285/300
3,913,382 A * 10/1975 Kurose .................... G01M 3/02
73/46
4,420,176 A * 12/1983 Cornwall ................... F16L 5/00
285/142.1
4,953,235 A * 9/1990 Cornwall ................... A62C 2/06
137/247.11

OTHER PUBLICATIONS

Main Link Industries Inc., "Products", believed to have been published no later than Feb. 14, 2017.
Roofmaster Drains & Vents, "4" XJ Fernco Expansion Joint , believed to have been published no later than Feb. 14, 2017.

* cited by examiner

*Primary Examiner* — Jessica Cahill
*Assistant Examiner* — Daphne M Barry
(74) *Attorney, Agent, or Firm* — Bryan W. Bockhop; Bockhop Intellectual Property Law, LLC

(57) ABSTRACT

A pipe coupling includes a rigid cylindrical member, a flexible cylindrical member and a hose clamp. The flexible cylindrical member includes a central tubular member within the rigid cylindrical member. A flexible sleeve extends beyond the rigid cylindrical member and has an inside diameter that is complimentary to a pipe. The sleeve has a first position in which the sleeve is folded back onto the rigid cylindrical member and a second position in which the sleeve is unfolded so as to envelope an end of the first pipe. The central tubular member includes a ledge that has an inside diameter corresponding to an inside diameter of the pipe.

14 Claims, 3 Drawing Sheets

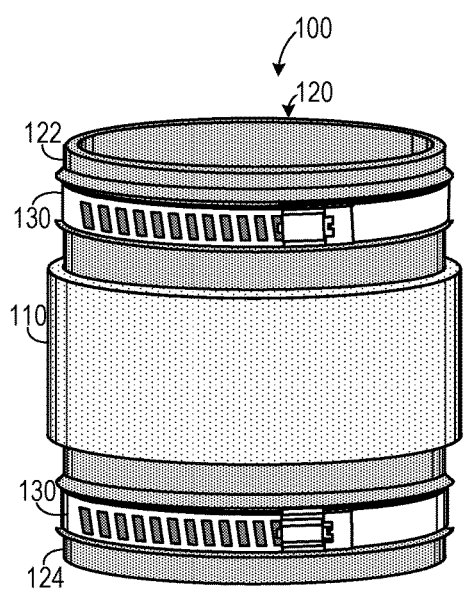
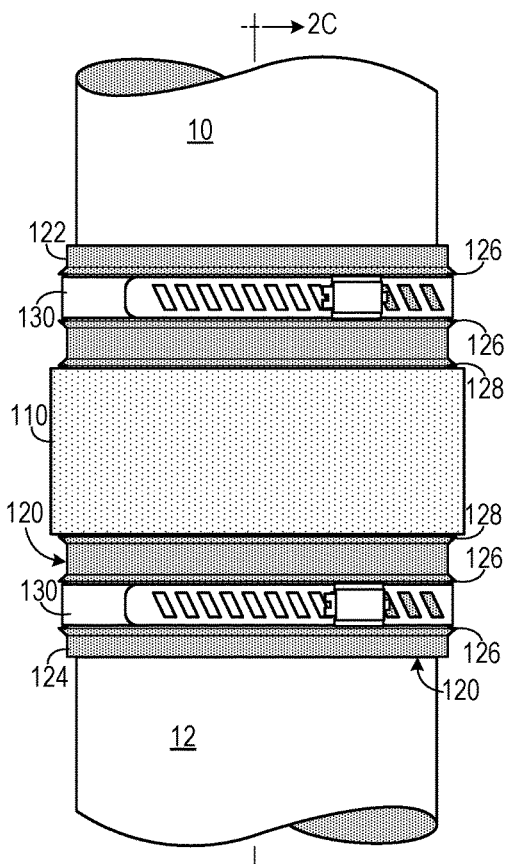
FIG. 1A
FIG. 1B

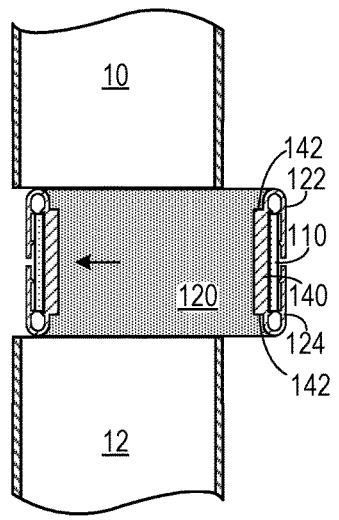 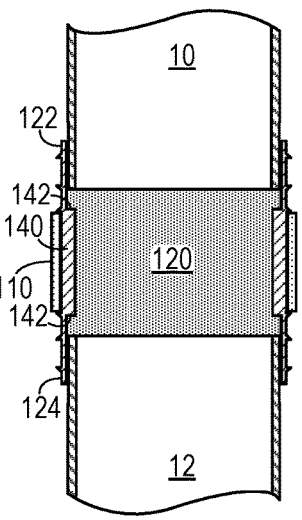 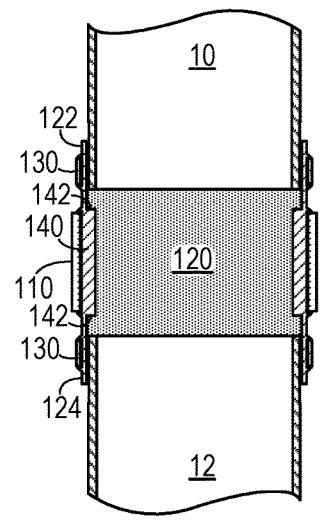
FIG. 2A  FIG. 2B  FIG. 2C
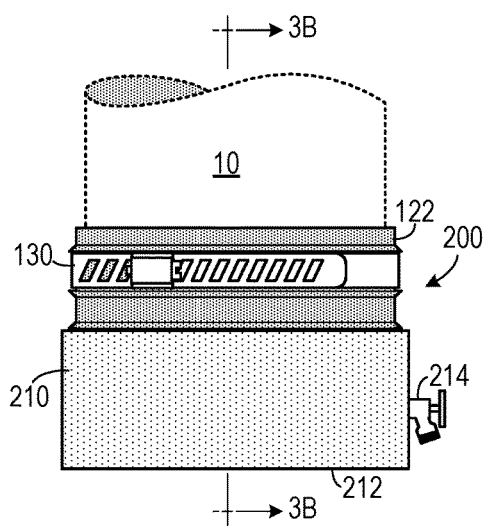 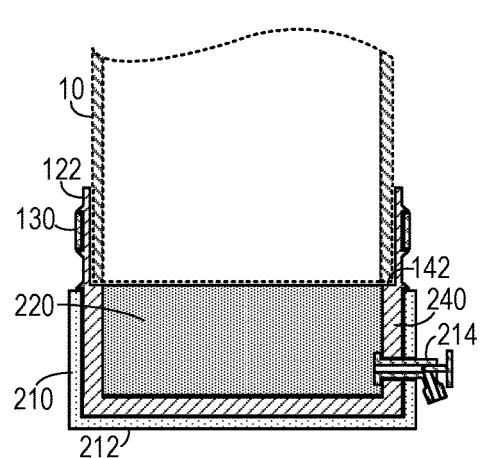
FIG. 3A  FIG. 3B

US 9,982,823 B1

PIPE COUPLING

BACKGROUND OF THE INVENTION

1. Field of the Invention

The present invention relates to pipe coupling systems and, more specifically, to a pipe coupling that can expand and contract.

2. Description of the Related Art

Architectural piping systems, such as PVC drain piping in multi-story buildings, are subject to expansion and contraction, which can result from changes in temperature. These changes may be due to external ambient temperatures or due to the influence of waste water discharging through the piping, such as water from dishwashers, showers, bath tubs and other hot water appliances.

Expansion and contraction of short runs of pipe tend to be of little concern in most applications since expansion or contraction within, for example, a 10 foot section of pipe with a 100° F. change in temperature is only about ¼"—which is usually absorbed within the piping and fittings themselves.

However, with a longer piping run, such as a main vertical drain stack in a high rise building, the piping can experience expansion (or contraction) of approximately ¼" for every 10 feet of the run. This can result in an expansion of from 6" to 10" in length near the top of a twenty story building. This expansion (or pipe contraction, as when the piping run is subjected to cold temperatures) can cause many problems, such as branch pipe breaking and pipes pitching. The pitching of pipes can dislodge fire stopping systems and can cause other problems.

Many piping runs employ periodically spaced expansion couplings to absorb expansion. One type of expansion coupling includes a hard rubber tube that couples two sections of pipe and is affixed thereto with a pair of hose clamps. Such expansion couplings can involve cumbersome installation and experience peripheral pressure buildup, which can lead to failure.

Most building codes require testing of drain pipe integrity under pressure. Such testing usually involves coupling a testing section to the bottom of the drain pipe run, plugging bottom of the run, filling the drain pipe with a column of water to a predetermined height and then inspecting the drain pipe for leaks. Once the testing is completed, the testing section is replaced with a permanent section of pipe. Such testing can be cumbersome.

Therefore, there is a need for an easy to install pipe coupling that maintains structural integrity after installation.

There is also a need to a reusable pipe testing section that is easy to install.

SUMMARY OF THE INVENTION

The disadvantages of the prior art are overcome by the present invention which, in one aspect, is a pipe coupling for coupling to a first pipe, that includes a rigid cylindrical member, a flexible cylindrical member and a hose clamp. The flexible cylindrical member includes a central tubular member disposed within a portion of the rigid cylindrical member. A first flexible sleeve extends beyond the rigid cylindrical member therefrom. The first flexible sleeve has an inside diameter that is complimentary to the first pipe. The first flexible sleeve has a first position in which the first flexible sleeve is folded back onto the rigid cylindrical member and a second position in which the first flexible sleeve is unfolded so as to envelope an end portion of the first pipe. The central tubular member includes a first ledge extending inwardly from the first flexible sleeve. The first ledge has an inside diameter corresponding to an inside diameter of the first pipe. The first hose clamp is disposed about the first flexible sleeve and is configured to secure the first flexible sleeve to the first pipe.

In another aspect, the invention is an expansion and contraction pipe coupling for coupling a first pipe to a second pipe that includes a rigid cylindrical member, a flexible cylindrical member, a first hose clamp and a second hose clamp. The flexible cylindrical member includes a unitary central tubular member disposed within a portion of the rigid cylindrical member and a first flexible sleeve extending beyond the rigid cylindrical member therefrom. The first flexible sleeve has an inside diameter that is complimentary to the first pipe. The first flexible sleeve has a first position, in which the first flexible sleeve is folded back onto the rigid cylindrical member, and a second position in which the first flexible sleeve is unfolded so as to envelope an end portion of the first pipe. A second flexible sleeve extends from the central tubular member beyond the rigid cylindrical member and has an inside diameter that is complimentary to the second pipe. The second flexible sleeve has a first position, in which the first flexible sleeve is folded back onto the rigid cylindrical member, and a second position in which the second flexible sleeve is unfolded so as to envelope an end portion of the second pipe. The first hose clamp is disposed about the first flexible sleeve and is configured to secure the first flexible sleeve to the first pipe. The second hose clamp is disposed about the second flexible sleeve and is configured to secure the second flexible sleeve to the second pipe.

In yet another aspect, the invention is a pipe tester that includes a rigid cylindrical member that opens to a first end and that has a floor at an opposite second end. A flexible cylindrical member includes a central tubular member disposed within a portion of the rigid cylindrical member and a first flexible sleeve extending beyond the rigid cylindrical member therefrom. The first flexible sleeve has an inside diameter that is complimentary to the first pipe. The first flexible sleeve has a first position, in which the first flexible sleeve is folded back onto the rigid cylindrical member, and a second position in which the first flexible sleeve is unfolded so as to envelope an end portion of the first pipe. A first hose clamp is disposed about the first flexible sleeve and is configured to secure the first flexible sleeve to the first pipe. A spigot is in fluid communication with an internal volume defined by the pipe coupling. The spigot is configured as a passage for pumping fluids into the first pipe and for draining fluids from the first pipe.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 1A is a perspective view of one embodiment of a pipe coupling.

FIG. 1B is an elevational view of the pipe coupling shown in FIG. 1A.

FIGS. 2A-2C is a series of cross-sectional views showing installation of the pipe coupling shown in FIG. 1B, taken along line 2C-2C.

FIG. 3A is an elevational view of one embodiment of a pipe tester.

FIG. 3B is a cross-sectional view of the pipe tester shown in FIG. 3A, taken along line 3A-3A.

DETAILED DESCRIPTION OF THE INVENTION

Figure 4:
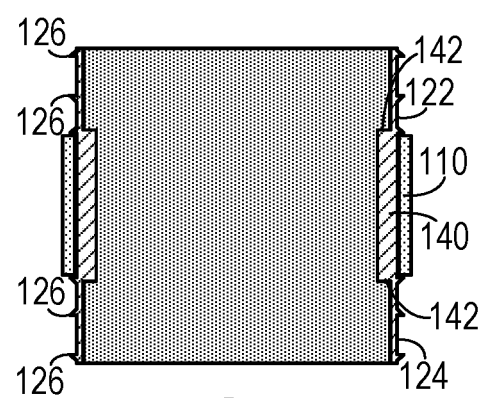
FIG. 4 is a cross-sectional view of an alternate embodiment of a pipe coupling.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1 and 2A-2C, one embodiment of a pipe coupling includes an expansion and contraction pipe coupling 100 that can be used to couple a first pipe 10 to a second pipe 12. The coupling 100 includes a rigid cylindrical member 110, which could be made from a piece of polyvinyl chloride (PVC) coupling pipe. In one embodiment which is used, for example, in coupling two 4" (inside diameter) PVC pipes, the rigid cylindrical member 110 includes a 2" long piece of 4" diameter ¼" thick PVC coupling pipe. It is readily understood that other lengths and thickness of pipe may be used without departing from the scope of the invention, depending upon the specific application. Also many other piping materials may be used in the cylindrical member 110, including (but not limited to): Chlorinated PVC, acrylonitrile butadiene styrene (ABS), steel, and combinations thereof, depending upon the specific application. A flexible cylindrical member 120 includes a central tubular member 140 disposed within the rigid cylindrical member 110. A first flexible sleeve 122 extends from the central tubular member 140 beyond the rigid cylindrical member 110 and has an inside diameter that is complimentary to the first pipe 10. A second flexible sleeve 124 extends from the central tubular member 140 beyond the rigid cylindrical member 110 and has an inside diameter that is complimentary to the second pipe 12. The first flexible sleeve 122 and the second flexible sleeve 124 each has a first position (as shown in FIG. 2A), in which they are folded back onto the rigid cylindrical member 110. Once folded back, the coupling 100 is pushed into a gap between the first pipe 10 and the second pipe 12 in which the gap has a length corresponding to the length of the coupling when the flexible sleeves 122 and 124 are folded back. Once the coupling 100 is in place (as shown in FIG. 2B), the sleeves are unfolded into a second position so as to envelope end portions of the first pipe 10 and the second pipe 12, respectively.

Once in place, the first sleeve 122 and the second sleeve 124 are secured to the pipes with hose clamps 130 (as shown in FIG. 2C), which could be, for example, a worm gear-type screw clamp. In alternate embodiments, the hose clamp 130 could be a spring clamp, a wire clamp, an ear clamp, a cable tie, etc. Typically, the hose clamp 130 would be made from stainless steel or one of the materials commonly used to make hose clamps that is suitable for the particular application.

The flexible cylindrical member 120 includes a unitary piece of a flexible and elastic material, such as synthetic rubber (e.g., a silicone rubber). Typically, it can be made using a conventional injection molding process. The specific material used should be able to withstand the environment to which the pipe is exposed and be elastic enough to accommodate the expected amounts of expansion and contraction of the pipes. For example, when used with a waste water drain pipe in a residential environment, the flexible cylindrical member 120 should be able to withstand a temperature range of at least between 32° F. and 212° F. (typically a wider temperature range would be used) without substantial degradation, which would allow drainage from sinks, washing machines, etc. It should also be resistant to any chemicals to which it would be likely to be exposed.

The central tubular member 140 has an inside diameter corresponding to an inside diameter of the pipes and defines a ledges 142. Because the flexible cylindrical member 120 includes a unitary piece of material, no separate O-ring is typically necessary when coupling the pipes.

The first flexible sleeve 122 and the second flexible sleeve 124 each includes a pair of spaced apart circular ridges 126 that hold the hose clamp 130 in a fixed position. The flexible cylindrical member 120 also includes a pair of spaced apart circular ridges 128 that hold the rigid cylindrical member 110 in a fixed position.

Installation of the present system to an existing pipe to introduce an expansion joint is relatively easy: a section of the existing pipe having a length corresponding to the length of the tubular member 140 is cut out of the existing pipe; the sleeves 122 and 124 are folded back and the coupling 100 is inserted between the pipe sections 10 and 12; the sleeves are unfolded up over the ends of the pipe sections 10 and 12; and the hose clamps 130 are applied to the sleeves and are tightened to secure the sleeves to the pipe sections 10 and 12.

In one embodiment, as shown in FIGS. 3A-3B, the coupling can be configured as a pipe tester 200. In this embodiment, the rigid cylindrical member 210 opens to a first end and has a floor 212 at an opposite second end. A flexible cylindrical member 240 is disposed within a portion of the rigid cylindrical member 240 and defines an internal volume 220 therein. A spigot 214 is in fluid communication with the internal volume 220 and can be used as passage for pumping fluids into the pipe 10 and for draining fluids from the pipe 10. To test the pipe under pressure, the pipe tester 200 can be affixed to the end of the pipe 10 and water can be pumped in through the spigot 214 until the pipe 10 has been filled to a predetermined level. Once filled, the pipe 10 can be checked for leaks and deformations. Once the test is completed, the water is drained out of the spigot 214, the pipe tester 200 is removed and a pipe coupling 100 (of the type shown in FIG. 1A) can be installed in its place.

In one alternative embodiment, as shown in FIG. 4, the sleeves 122 and 124 would not extend beyond the ridges 126. This would reduce the cost of materials associated with the coupling.

In one commercial embodiment, the pipe coupling 100 could be used as a mechanical flex coupling in conjunction to control expansion and contraction in plastic drain piping installed in tall buildings. It can be used in conjunction with a fire stop sleeve embedded into a poured concrete floor at each floor level that secures and restricts movement of the pipe. The mechanical flex coupling would typically allow a minimum of ½" expansion or contraction at each floor level.

In this commercial embodiment, the mechanical flex coupling allows a fixed point connection between two pipes that must connect together. This is done by flexing both the top and bottom portions of the coupling back onto its 2" rigid PVC coupling pipe. The flexed coupling is inserted into a 2½" opening between the two connecting plastic pipes. The flexible portions on each end of the coupling are rolled back onto the two connecting pipes, and then secured to the pipes with two stainless steel bands with a tightening clamp.

This embodiment separates the pipe expansion and contraction at each floor and prevents the expansion from growing by ¼" per every 10 ft. of piping. Plastic drain piping is subject to expansion and contraction with any type change of external ambient temperatures. This could be due to the influence of hot waste water discharging through the piping from items such as dishwashers, showers or other hot water appliances. (Without using some system for expansion, the piping could grow 6" to 10" near the top of a twenty story building and harm the integrity of the plastic drainage piping system.)

A PVC flanged anchor type assembly can be used to secure the piping at the floor lever in wood construction. This is done using holes through the fastening flange to secure the anchor to the wood floor. The pass-through pipe is solvent cemented to the pipe size opening inside the flange. The mechanical flex coupling can be used absorb the expansion and contraction in wood construction. This embodiment limits pipe expansion and contraction at each floor and can be especially useful in high rise buildings.

As will be readily appreciated by those of skill in the art, a coupling of this type could be configured in which the sleeves are adapted to fit different diameters of pipe to facilitate the coupling of different diameters of pipe to each other. Also, a coupling of this type could be made with more than two sleeves, to accommodate connecting more than two pipes. For example, it could be adapted as a "T" fitting.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A pipe coupling for coupling to a first pipe, comprising:
   (a) a rigid cylindrical member;
   (b) a single continuous unitary flexible cylindrical member including a central tubular portion disposed within the rigid cylindrical member, a first flexible sleeve extending beyond the rigid cylindrical member therefrom, the first flexible sleeve having an inside diameter that is complimentary to the first pipe, the first flexible sleeve having a first position in which the first flexible sleeve is folded back onto the rigid cylindrical member and a second position in which the first flexible sleeve is unfolded so as to envelope an end portion of the first pipe, the central tubular portion including a first ledge extending inwardly from the first flexible sleeve, the first ledge having an inside diameter corresponding to an inside diameter of the first pipe, a second flexible sleeve extending from the central tubular portion beyond the rigid cylindrical member and having an inside diameter that is complimentary to the second pipe, the second flexible sleeve having a first position, in which the first flexible sleeve is folded back onto the rigid cylindrical member, and a second position in which the second flexible sleeve is unfolded so as to envelope an end portion of the second pipe, wherein the central tubular portion, the first flexible sleeve and the second flexible sleeve are all one piece;
   (c) a first hose clamp disposed about the first flexible sleeve and configured to secure the first flexible sleeve to the first pipe; and
   (d) a second hose clamp disposed about the second flexible sleeve and configured to secure the second flexible sleeve to the second pipe.

2. The pipe coupling of claim 1, wherein the rigid cylindrical member comprises a section of polyvinyl chloride pipe.

3. The pipe coupling of claim 1, wherein the flexible cylindrical member comprises a synthetic rubber.

4. The pipe coupling of claim 1, wherein the first flexible sleeve includes a pair of spaced apart circular ridges extending outwardly therefrom and defining a space therebetween, the space configured to hold the hose clamp in a fixed relationship to the first flexible sleeve.

5. The pipe coupling of claim 1, wherein the flexible cylindrical member includes a pair of spaced apart circular ridges extending outwardly therefrom and defining a space therebetween, the space configured to hold the rigid cylindrical member in a fixed relationship to the flexible cylindrical member.

6. An expansion and contraction pipe coupling for coupling a first pipe to a second pipe, comprising:
   (a) a rigid cylindrical member that includes a section of polyvinyl chloride pipe;
   (b) a single continuous unitary flexible cylindrical member including a unitary central tubular portion disposed within a portion of the rigid cylindrical member and a first flexible sleeve extending beyond the rigid cylindrical member therefrom, the first flexible sleeve having an inside diameter that is complimentary to the first pipe, the first flexible sleeve having a first position, in which the first flexible sleeve is folded back onto the rigid cylindrical member, and a second position in which the first flexible sleeve is unfolded so as to envelope an end portion of the first pipe, a second flexible sleeve extending from the central tubular portion beyond the rigid cylindrical member and having an inside diameter that is complimentary to the second pipe, the second flexible sleeve having a first position, in which the first flexible sleeve is folded back onto the rigid cylindrical member, and a second position in which the second flexible sleeve is unfolded so as to envelope an end portion of the second pipe, the flexible cylindrical member including a pair of spaced apart circular ridges extending outwardly therefrom and defining a space therebetween, the space configured to hold the rigid cylindrical member in a fixed relationship to the flexible cylindrical member, wherein the central tubular portion, the first flexible sleeve and the second flexible sleeve are all one piece;
   (c) a first hose clamp disposed about the first flexible sleeve and configured to secure the first flexible sleeve to the first pipe; and
   (d) a second hose clamp disposed about the second flexible sleeve and configured to secure the second flexible sleeve to the second pipe.

7. The expansion and contraction pipe coupling of claim 6, wherein the flexible cylindrical member comprises a synthetic rubber.

8. The expansion and contraction pipe coupling of claim 6, wherein the central tubular portion has an inside diameter corresponding to an inside diameter of the first pipe and the second pipe, a first ledge defined where the first flexible sleeve extends from the central tubular portion and a second ledge defined where the second flexible sleeve extends from the central tubular portion.

9. The expansion and contraction pipe coupling of claim 6, wherein the first flexible sleeve and the second flexible sleeve each includes a pair of spaced apart circular ridges extending outwardly therefrom and defining a space therebetween, the space configured to hold the hose clamp in a fixed relationship thereto.

10. The expansion and contraction pipe coupling of claim 6, wherein the flexible cylindrical member includes a pair of spaced apart circular ridges extending outwardly therefrom and defining a space therebetween, the space configured to hold the rigid cylindrical member in a fixed relationship to the flexible cylindrical member.

11. A pipe coupling for coupling to a first pipe, comprising:
   (a) a rigid cylindrical member;
   (b) a single continuous unitary synthetic rubber flexible cylindrical member including a central tubular portion disposed within the rigid cylindrical member, a first flexible sleeve extending beyond the rigid cylindrical member therefrom, the first flexible sleeve having an inside diameter that is complimentary to the first pipe, the first flexible sleeve having a first position in which the first flexible sleeve is folded back onto the rigid cylindrical member and a second position in which the first flexible sleeve is unfolded so as to envelope an end portion of the first pipe, the central tubular portion including a first ledge extending inwardly from the first flexible sleeve, the first ledge having an inside diameter corresponding to an inside diameter of the first pipe, a second flexible sleeve extending from the central tubular portion beyond the rigid cylindrical member and having an inside diameter that is complimentary to the second pipe, the second flexible sleeve having a first position, in which the first flexible sleeve is folded back onto the rigid cylindrical member, and a second position in which the second flexible sleeve is unfolded so as to envelope an end portion of the second pipe, wherein the central tubular portion, the first flexible sleeve and the second flexible sleeve are all one piece;
   (c) a first hose clamp disposed about the first flexible sleeve and configured to secure the first flexible sleeve to the first pipe; and
   (d) a second hose clamp disposed about the second flexible sleeve and configured to secure the second flexible sleeve to the second pipe.

12. The pipe coupling of claim 11, wherein the rigid cylindrical member comprises a section of polyvinyl chloride pipe.

13. The pipe coupling of claim 11, wherein the first flexible sleeve includes a pair of spaced apart circular ridges extending outwardly therefrom and defining a space therebetween, the space configured to hold the hose clamp in a fixed relationship to the first flexible sleeve.

14. The pipe coupling of claim 11, wherein the flexible cylindrical member includes a pair of spaced apart circular ridges extending outwardly therefrom and defining a space therebetween, the space configured to hold the rigid cylindrical member in a fixed relationship to the flexible cylindrical member.

* * * * *